United States Patent [19]
Suginoya et al.

[11] Patent Number: 6,050,870
[45] Date of Patent: Apr. 18, 2000

[54] DISPLAY DEVICE AND METHOD OF MANUFACTURING THE SAME

[75] Inventors: Mitsuru Suginoya; Kazuo Shimada, both of Chiba, Japan

[73] Assignee: Seiko Instruments, Inc., Chiba, Japan

[21] Appl. No.: 09/003,571

[22] Filed: Jan. 6, 1998

Related U.S. Application Data

[62] Division of application No. 08/567,572, Dec. 5, 1995, abandoned.

[30] Foreign Application Priority Data

Dec. 9, 1994 [JP] Japan .................................. 6-306626

[51] Int. Cl.$^7$ ...................................................... H01J 9/00
[52] U.S. Cl. .............................. 445/24; 65/30.14
[58] Field of Search ............................ 65/30.14; 445/24

[56] References Cited

U.S. PATENT DOCUMENTS

| | | | |
|---|---|---|---|
| 3,301,649 | 1/1967 | Marusak | 65/30.14 |
| 4,803,106 | 2/1989 | Lenhart et al. | 65/30.14 |
| 4,895,432 | 1/1990 | Iwashita et al. | 349/138 |
| 5,127,931 | 7/1992 | Kiefer et al. | |
| 5,250,451 | 10/1993 | Chouan | 437/40 |
| 5,514,485 | 5/1996 | Ando et al. | |
| 5,725,625 | 3/1998 | Kitayama et al. | 65/30.14 |

*Primary Examiner*—Kenneth J. Ramsey
*Attorney, Agent, or Firm*—Loeb & Loeb LLP

[57] ABSTRACT

In a display device in which glass substrates are pasted together and a display material is filled therebetween and a method of manufacturing the same, provided is a display device composed of soda glass chemically strengthened by substituting atoms having an ionic radius larger than that of sodium atoms for sodium atoms on the surfaces of the glass substrates, and a method of manufacturing a display device wherein a chemical strengthening is carried out by dipping a soda glass substrate or a cell for the display device manufactured by using the substrate in a solution or a molten solution of a salt including cations having an ionic radius larger than that of sodium atoms.

12 Claims, 4 Drawing Sheets

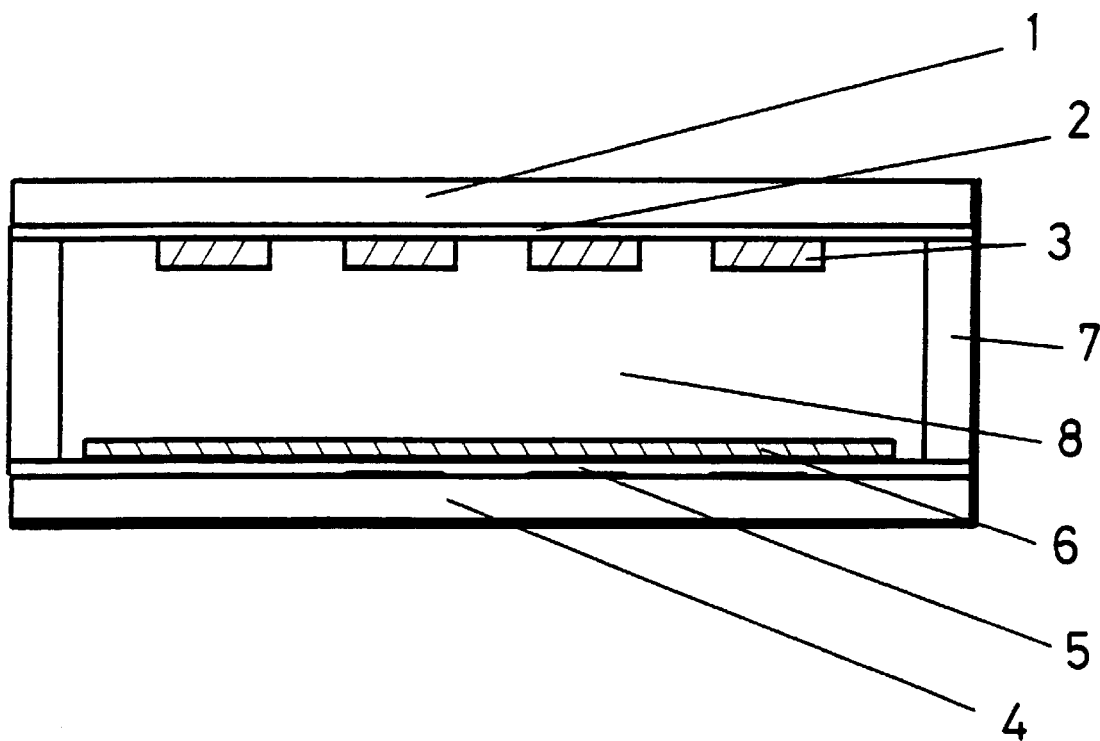
F I G. 1

F I G. 3 A 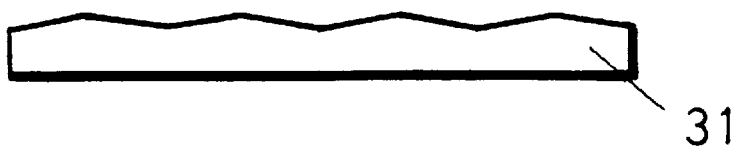
F I G. 3 B 
F I G. 3 C 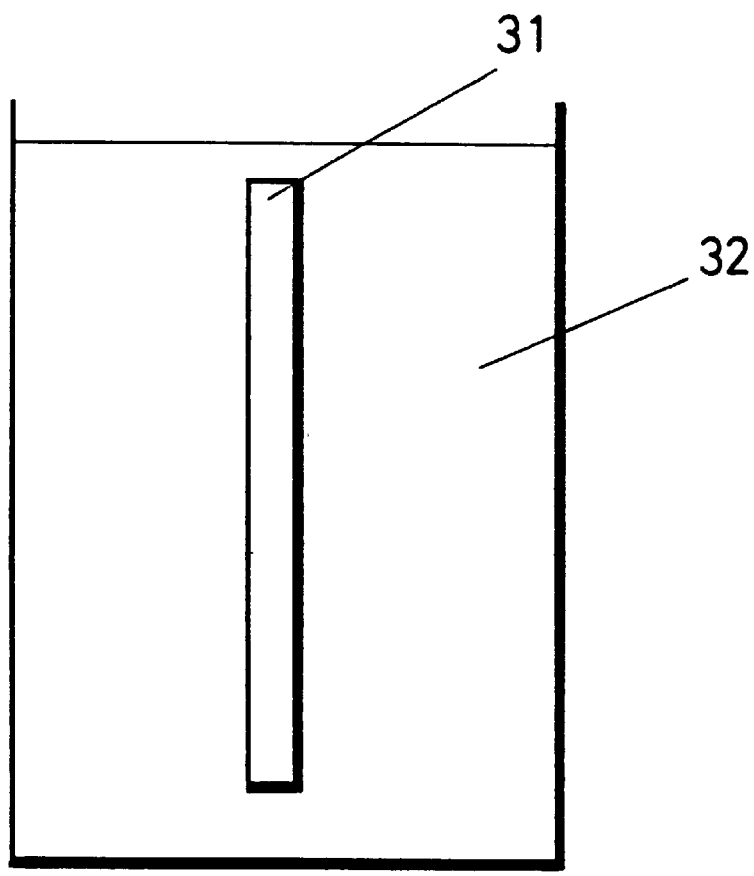

F I G. 4 A
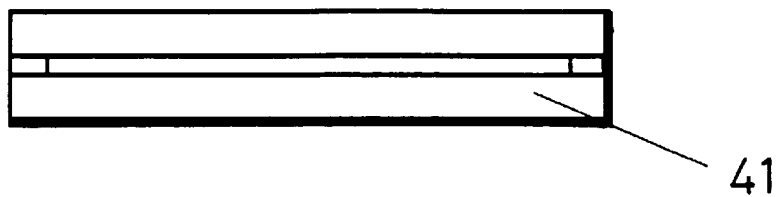
F I G. 4 B
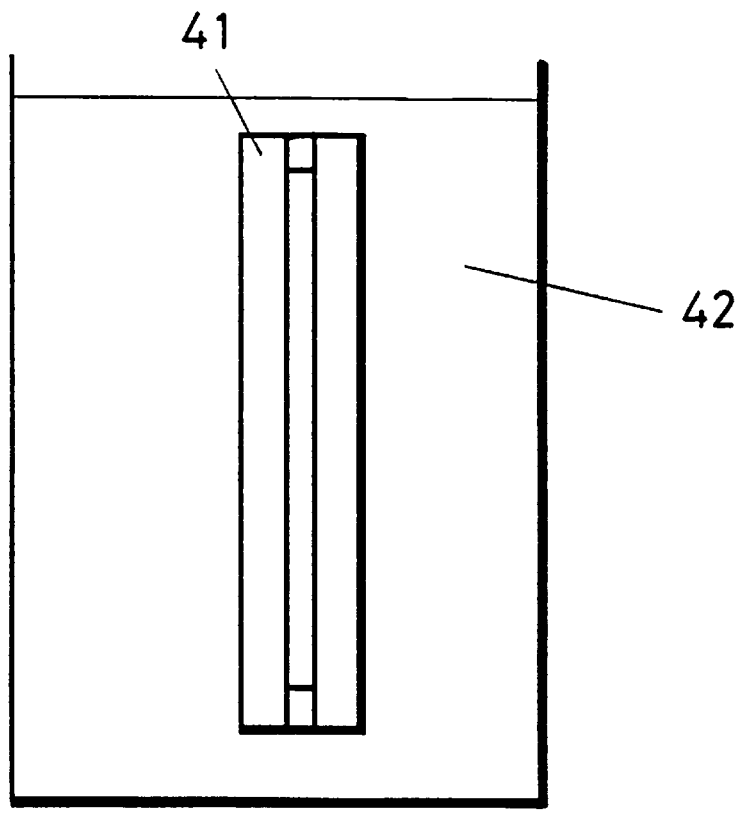

DISPLAY DEVICE AND METHOD OF MANUFACTURING THE SAME

This is a division application of application Ser. No. 08/567,572 filed on Dec. 5, 1995, now abandoned.

BACKGROUND OF THE INVENTION

The present invention relates to a display device and a method of manufacturing the same, particularly to a display device and a method of manufacturing the same in which a strength thereof such as impact resistance is promoted.

PRIOR ART

FIG. 2 shows an example of a conventional display device and a method of manufacturing the same. In FIG. 2 numeral 11 designates a glass substrate made of soda-lime glass, borosilicate glass or the like on the surface of which a sodium passivation film 12 made of $SiO_2$ is formed and a film of a transparent electrode 13 made of ITO is formed and patterned by a method of vapor deposition, sputtering or the like. A glass substrate 14 on the surface of which a sodium passivation film 15 and a transparent electrode 16 are successively formed as in the glass substrate 11, and the glass substrate 11 oppose each other, both are pasted together by a sealing agent 17 and a display material 18 such as a liquid crystal or an electrochromic material is filled in the clearance whereby a display device is formed.

Currently, such a display device is widely used ranging from a digital watch to a display for a computer by utilizing its portability and low power consumption since it is a flat panel different from a CRT.

However, such a flat panel display currently uses glass for the substrates due to its high transparency. However, it has a drawback in which it is apt to crack since it is made of glass.

Especially, the flat panel display is often used in a portable type electronic instrument and accordingly, it is preferable that it is strong against drop impact. However, the portable type electronic instrument is further required to be light, thin, short and small. Then, the instrument includes a conflicting problem wherein the thickness of a glass substrate is thinned and the strength is decreased to satisfy the requirement.

SUMMARY OF THE INVENTION

To resolve the above problem, with a purpose of maintaining sufficient strength even with a thin thickness of the glass substrate, the inventors found a display device made of soda glass which is chemically strengthened by substituting atoms having an ionic radius larger than that of sodium atoms for sodium atoms of the surface and the method of manufacturing the same.

According to the method of promoting the strength of glass of this invention, a soda glass substrate or a cell for a display device made by using the substrate is merely dipped in a salt solution or a molten salt solution including cations having an ionic radius larger than that of sodium atoms whereby a display device having enhanced strength can be provided in a very simple way.

Essentially glass is provided with a considerable theoretical strength. However, brittle fracture is very easily caused in glass in practice. One cause is that when defects in some form are distributed on the surface, since tensile stress is present on the surface of glass, the stress concentrates on the defects and the defects become fracture initiation points by which the glass is destructed at a value of the strength considerably lower than the theoretical strength. In view of such a fracture mechanism of glass, it is proposed to promote the strength of glass by using air jets tempered glass, low thermal expansion glass, high elasticity modulus glass, crystallized glass, chemically strengthened glass and the like.

In air jets tempered glass the strength against fracture is promoted by changing the tensile stress present on the surface of glass into compressive stress. Specifically, air jets are blown on the surface of a glass plate heated approximately at 700° C. and the glass plate is cooled while maintaining a temperature difference between at the inner portion and on the surface. Then, the strength of glass is preserved in the solidified state in forms of compressive stress on the surface and tensile stress at the inner portion in accordance with the temperature difference by which the strength of glass is promoted. At this occasion the compressive stress on the surface reaches 900 through 1,500 $kg/cm^2$ and the tensile stress at the inner portion becomes 300 through 500 $kg/cm^2$.

The low thermal expansion glass was devised to improve destruction by thermal stress caused by heating or cooling glass.

In the high elasticity modulus glass nitrogen having strong bonding force is introduced in conventional oxide glass by which a network of glass is strengthened wherein the modulus of elasticity can be enhanced by 30 to 50% thereby achieving promotion of strength.

In the crystallized glass a kind of composite material is formed by reheating glass and dispersing crystal particles in a matrix wherein propagation of fracture crack is prevented by the crystal particles.

In the chemically strengthened glass the strength against fracture is promoted by changing the tensile stress present on the surface of glass into compre sive stress as in the air jets tempered glass. Specifically, glass including alkaline ions (Li or Na) having a small ionic radius is dipped in an alkaline molten salt having a large ionic radius at a temperature region (for example 400° C.) which is equal to or lower than the glass transition point by which ion exchange between both is performed on the surface of glass. As a result the volume is increased and compressive stress is present after cooling the surface layer of glass. The compressive stress is approximately 100 $kg/mm^2$ When application of the air jets tempered glass, the low thermal expansion glass, the high elasticity modulus glass and the crystallized glass to a display device is considered, there are restrictions in which the composition of glass per se is changed or the treatment is performed in manufacturing glass and cannot be carried out in later working steps. However, the chemically strengthened glass can be treated at comparatively low temperatures and therefore the treatment can be incorporated in the manufacturing steps of a display device and the treatment can be performed even after a step particular to a display device (polishing step etc.) has been performed, which does not considerably change and complicates the manufacturing steps of the conventional display device.

Therefore, the present invention adopts chemical strengthening as a method of strengthening glass, incorporates it in the manufacturing steps of a display device and provides a display device having promoted strength by simple steps without complicating the steps.

BRIEF DESCRIPTION OF THE DRAWINGS

FIG. 1 is a sectional view of a display device according to the present invention.

FIG. 3 is a view showing chemical strengthening steps according to the present invention.

FIG. 4 is a view showing other chemical strengthening steps according to the present invention.

DETAILED DESCRIPTION OF THE PREFERRED EMBODIMENTS

Figure 2:
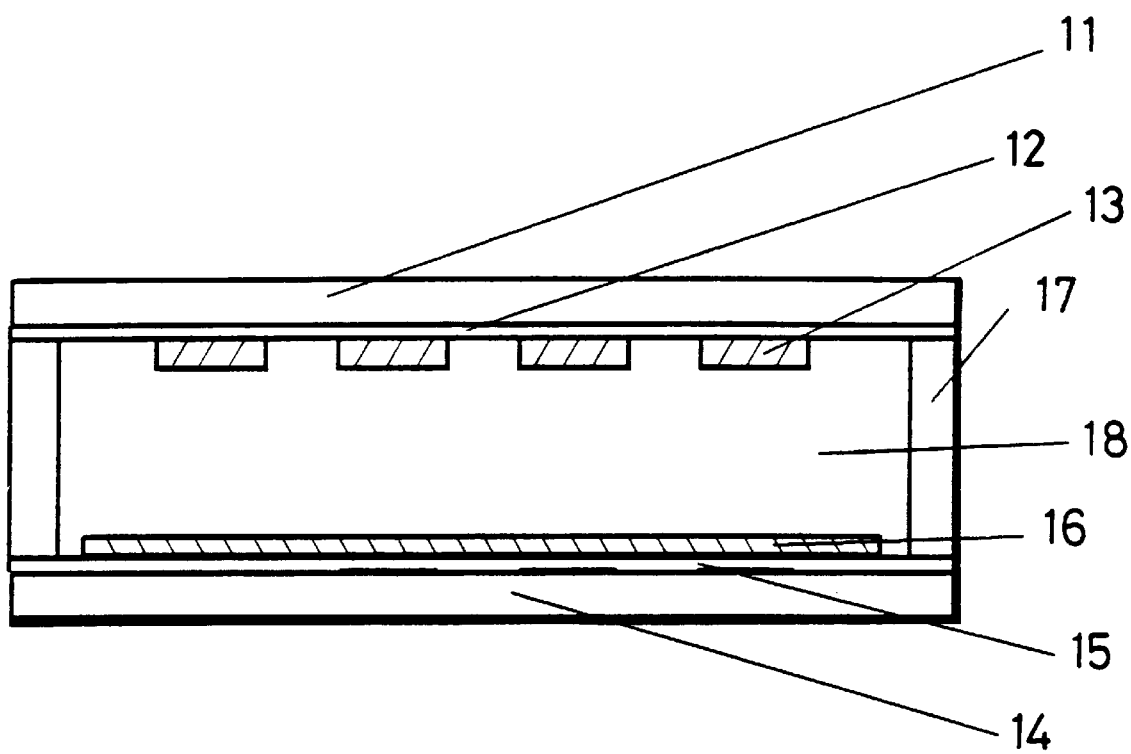
FIG. 2 is a sectional view of a conventional display device.

A specific explanation will be given of the effect of the present invention based on examples as follows.

EXAMPLE 1

FIG. 1 is a view showing an example of a display device according to the present invention.

In FIG. 1 numeral 1 designates a glass substrate made of soda glass which is manufactured by a method illustrated by FIG. 3. In FIG. 3 (a) soda glass 31 having a thickness of 0.55 mm is prepared. In FIG. 3 (b) polishing is performed to a degree whereby smoothness of surface is sufficient for the display device. In FIG. 3 (c) the soda glass is dipped in a strengthening solution 32 composed of a mixed molten salt of 50% $KNO_3$ and 50% $KNO_2$ at 430° C. by which a chemical strengthening is performed thereby forming the glass substrate 1 as shown in FIG. 1. On the glass substrate a sodium passivation film 2 made of $SiO_2$ is formed and a film of a transparent electrode 3 made of ITO formed by a method such as sputtering or the like is patterned. A sodium passivation film 5 and a transparent electrode 6 are formed on a glass substrate 4 the surface of which has been polished and chemically strengthened as in the glass substrate 1, the glass substrate 4 is opposed to the glass substrate 1, the both are pasted together by a sealing agent 7 and a display material 8 constituted by STN liquid crystals is filled in the clearance thereby forming a display device.

In such a STN liquid crystal display device an accuracy of ±0.05 μm is required with regard to the surface of substrate to achieve an uniform thickness of a liquid crystal layer and accordingly, the polishing of the surface of glass is an indispensable step. However, when the strengthened glass is used in the raw material from the start, the polishing of the surface is difficult to perform and the step is extremely difficult. When the chemical strengthening is performed at comparatively low temperatures after polishing as in this example, the smoothness of the surface of glass can simply be provided, warp or undulation of glass is avoided in the later steps of strengthening and the display device with promoted strength can be achieved without deteriorating display function. In fact no destruction was found when the display device of this example was dropped from the height of 2 meters.

EXAMPLE 2

A display device was manufactured as in Example 1 except that the strengthening solution in FIG. 3 (c) of the Example 1 is composed of a mixed molten salt of 50% $KNO_3$ and 50% $RbNO_3$ with an effect similar to that of Example 1.

EXAMPLE 3

In FIG. 1 a sodium passivation film 2 made of $SiO_2$ is formed on a glass substrate 1 made of soda glass having a thickness of 0.55 mm of which surface has been polished and a film of ITO is successively formed and patterned by a method such as vapor deposition, sputtering or the like thereby forming a transparent electrode 3. Similarly, a sodium passivation film 5 and a transparent electrode 6 are successively laminated on a polished glass substrate 4, the glass substrate 1 and the glass substrate 4 are opposed to each other and both are pasted together by a sealing agent 7 thereby forming a display cell.

Next, a chemical strengthening is carried out by a method illustrated by FIG. 4.

In FIG. 4 (a) the above-mentioned display cell 41 is prepared. One thing to be careful about here is a necessity of sealing holes such as liquid crystal injection ports, provided on the display cell such that a solution does not enter the holes. In FIG. 4 (b) the display cell 41 is chemically strengthened by immersing it in a strengthening solution 42 composed of a $KNO_3$ molten salt that is heated at 400° C. Continuing the explanation by going back to FIG. 1, when a display device was manufactured by filling a display material 8 constituted by liquid cells in the chemically strengthened display cell, an effect similar to that in FIG. 1 is provided. As a point to be careful about in this example it is preferable that material of a sealing agent or a sealant is provided with a sufficient heat resistance since the display cell is dipped in the molten salt at 400° C.

EXAMPLE 4

In FIG. 1 a sodium passivation film 2 made of $SiO_2$ is formed on a glass substrate 1 made of soda glass having a thickness of 0.55 mm of which surface has been polished and a film of ITO is formed and patterned by a method such as vapor deposition, sputtering or the like thereby forming a transparent electrode 3. Similarly a sodium passivation film 5 and a transparent electrode 6 are successively laminated on a polished glass substrate 4, the glass substrate 1 and the glass substrate 4 are opposed to each other, both are pasted together by a sealing agent 7 and a display material 8 composed of liquid crystals is filled in the clearance thereby forming a display device.

Next, a chemical strengthening is performed by a method illustrated by FIG. 4.

In FIG. 4 (a) the above-mentioned display device 41 is prepared. In FIG. 4 (b) the display cell 41 is chemically strengthened at 100° C. by dipping it in a strengthening solution 42 comprising an acidic solution of $KNO_3$. At this occasion hydrochloric acid, perchloric acid, bromic acid, hydrofluoric acid, nitric acid, sulfuric acid, phosphoric acid, formic acid, acetic acid and the like can be used to make the solution acidic and an aqueous solution or the like can be used for the solution. An effect similar to that in Example 1 is provided to the display device which has been chemically strengthened as above. In this example the temperature of chemical strengthening is low and accordingly, not so much heat resistance is required for material of a sealing agent or the like, the treatment can be carried out even after filling a display material having low heat resistance as liquid crystals whereby a simpler method can be performed.

As has been explained in details by examples, according to the display device and a method of manufacturing the same in this invention, a soda glass substrate or a cell for a display device which has been manufactured by using the substrate is merely dipped in a solution or a molten solution of a salt including cations having an ionic radius larger than that of sodium atoms whereby the display device with promoted strength can be provided very simply.

According to the method a chemical strengthening is performed by substituting atoms having an ionic radius larger than that of sodium atoms for sodium atoms on the surface of glass and therefore, a sufficient strength can be maintained even if the thickness of the glass substrate is thinned.

Thereby a portable type display device with promoted drop impact resistance can simply be provided.

What is claimed is:

1. A method of manufacturing a display device comprising, in the order recited, the steps of:

providing two soda-lime glass plates having main surfaces;

polishing at least one main surface of each of the glass plates;

dipping each of the two glass plates in a salt solution which contains cations having an ionic radius which is larger than the ionic radius of sodium in order to strengthen the glass plates to form compression strength of approximately 100 kg/mm$^2$ at the surface;

forming a passivation film on the polished main surface of each of the glass plates;

forming transparent electrodes on the passivation film on each of the glass plates; and assembling the two glass plates together with a gap therebetween and filling the gap with liquid crystals.

2. The method according to claim 1 wherein said step of dipping includes heating the salt solution.

3. The method according to claim 2 wherein the salt solution is a molten salt solution.

4. The method according to claim 1 wherein the cations which have an ionic radius larger than the ionic radius of sodium are selected from the group consisting of potassium and rubidium.

5. A method of manufacturing a display device, comprising the steps of:

providing two soda-lime glass plates;

forming at least one transparent electrode on a surface of each of the glass plates;

assembly and pasting the two glass plates together with the surfaces which carry the electrodes facing one another to form a cell; and dipping the cell in a salt solution which contains cations having an ionic radius which is larger than the ionic radius of sodium in order to strengthen the glass plates.

6. The method according to claim 5 wherein said step of dipping includes heating the salt solution.

7. The method according to claim 6 wherein the salt solution is a molten salt solution.

8. The method according to claim 5 wherein the cations which have an ionic radius larger than the ionic radius of sodium are selected from the group consisting of potassium and rubidium.

9. The method according to claim 5 wherein said step of assembling and pasting is performed so that a gap exists between the glass plates, and further comprising, after said step of assembling and pasting, the step of filling the gap between the glass plates with liquid crystals.

10. The method according to claim 9 wherein said step of dipping includes heating the salt solution.

11. The method according to claim 10 wherein the salt solution is a molten salt solution.

12. The method according to claim 9 wherein the cations which have an ionic radius larger than the ionic radius of sodium are selected from the group consisting of potassium and rubidium.

* * * * *